US012591712B2

(12) United States Patent
Todd et al.

(10) Patent No.: US 12,591,712 B2
(45) Date of Patent: Mar. 31, 2026

(54) DATA CONFIDENCE GRAPHS

(71) Applicant: Dell Products L.P., Round Rock, TX (US)

(72) Inventors: Stephen J. Todd, North Andover, MA (US); Trevor Scott Conn, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 18/392,773

(22) Filed: Dec. 21, 2023

(65) Prior Publication Data

US 2025/0209209 A1 Jun. 26, 2025

(51) Int. Cl.
| | |
|---|---|
| *G06F 21/64* | (2013.01) |
| *G06F 16/22* | (2019.01) |
| *G06F 16/23* | (2019.01) |
| *G06F 16/901* | (2019.01) |
| *H04L 9/06* | (2006.01) |
| *H04L 9/40* | (2022.01) |

(52) U.S. Cl.
CPC .......... *G06F 21/64* (2013.01); *G06F 16/2237* (2019.01); *G06F 16/2365* (2019.01); *G06F 16/9024* (2019.01); *H04L 9/0643* (2013.01); *H04L 63/1408* (2013.01); *H04L 63/1416* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 11,308,076 | B2 * | 4/2022 | Todd .................. | G06F 16/2237 |
| 11,544,253 | B2 * | 1/2023 | Todd .................. | G06F 16/2379 |
| 2007/0250615 | A1 * | 10/2007 | Hillier ................ | H04L 41/0873 |
| | | | | 709/223 |
| 2013/0290195 | A1 * | 10/2013 | Frazier ............... | G06Q 30/0278 |
| | | | | 705/306 |
| 2015/0186756 | A1 * | 7/2015 | Fujii .................... | G06F 40/279 |
| | | | | 382/229 |
| 2017/0149813 | A1 * | 5/2017 | Wright ................. | G06F 21/552 |
| 2017/0214927 | A1 * | 7/2017 | Zenoni .................. | H04N 19/42 |
| 2018/0285599 | A1 * | 10/2018 | Praveen ................ | G06F 18/22 |
| 2019/0267135 | A1 * | 8/2019 | Mears ................... | G16H 50/20 |
| 2020/0265134 | A1 * | 8/2020 | Cristina ................ | G06F 21/54 |
| 2021/0021619 | A1 * | 1/2021 | Smith .................. | H04L 63/145 |
| 2021/0124727 | A1 * | 4/2021 | Todd .................. | G06F 16/2237 |

(Continued)

FOREIGN PATENT DOCUMENTS

| | | | | |
|---|---|---|---|---|
| CN | 115658799 | A * | 1/2023 | |
| CN | 116185643 | A * | 5/2023 | ............. G06F 9/505 |

*Primary Examiner* — Ali H. Cheema
(74) *Attorney, Agent, or Firm* — Workman Nydegger

(57) ABSTRACT

One example method includes, in a node of a data confidence fabric (DCF), the node comprising hardware, obtaining, when available, a static confidence score for a lowermost layer of an infrastructure of the node, after a workload is orchestrated to the node, obtaining, when available, a workload confidence score, when the static confidence score and the workload confidence score are available, aggregating the static confidence score and the workload confidence score together to obtain an overall infrastructure confidence score, and applying, by the node, the overall infrastructure confidence score to data passing through the node.

16 Claims, 11 Drawing Sheets

(56)                    References Cited

U.S. PATENT DOCUMENTS

| | | | |
|---|---|---|---|
| 2021/0124728 A1* | 4/2021 | Todd | G06F 16/2365 |
| 2021/0165688 A1* | 6/2021 | Reyes | G06F 11/2023 |
| 2021/0377282 A1* | 12/2021 | Wojnowicz | H04L 63/145 |
| 2022/0100564 A1* | 3/2022 | Venkitachalam | G06F 11/3409 |
| 2022/0247638 A1* | 8/2022 | Engi | G06N 20/00 |
| 2022/0413943 A1* | 12/2022 | Poornachandran | G06F 9/5088 |
| 2023/0131495 A1* | 4/2023 | Tater | G06F 40/30 |
| | | | 706/45 |
| 2023/0385173 A1* | 11/2023 | Pinnaka | G06F 11/3476 |
| 2024/0070673 A1* | 2/2024 | Sharma | G06N 3/0442 |
| 2024/0291747 A1* | 8/2024 | Hecht | H04L 41/12 |
| 2024/0314030 A1* | 9/2024 | Sanchez Vilchez | H04L 41/0806 |

* cited by examiner

800

900

Figures 10, 11:
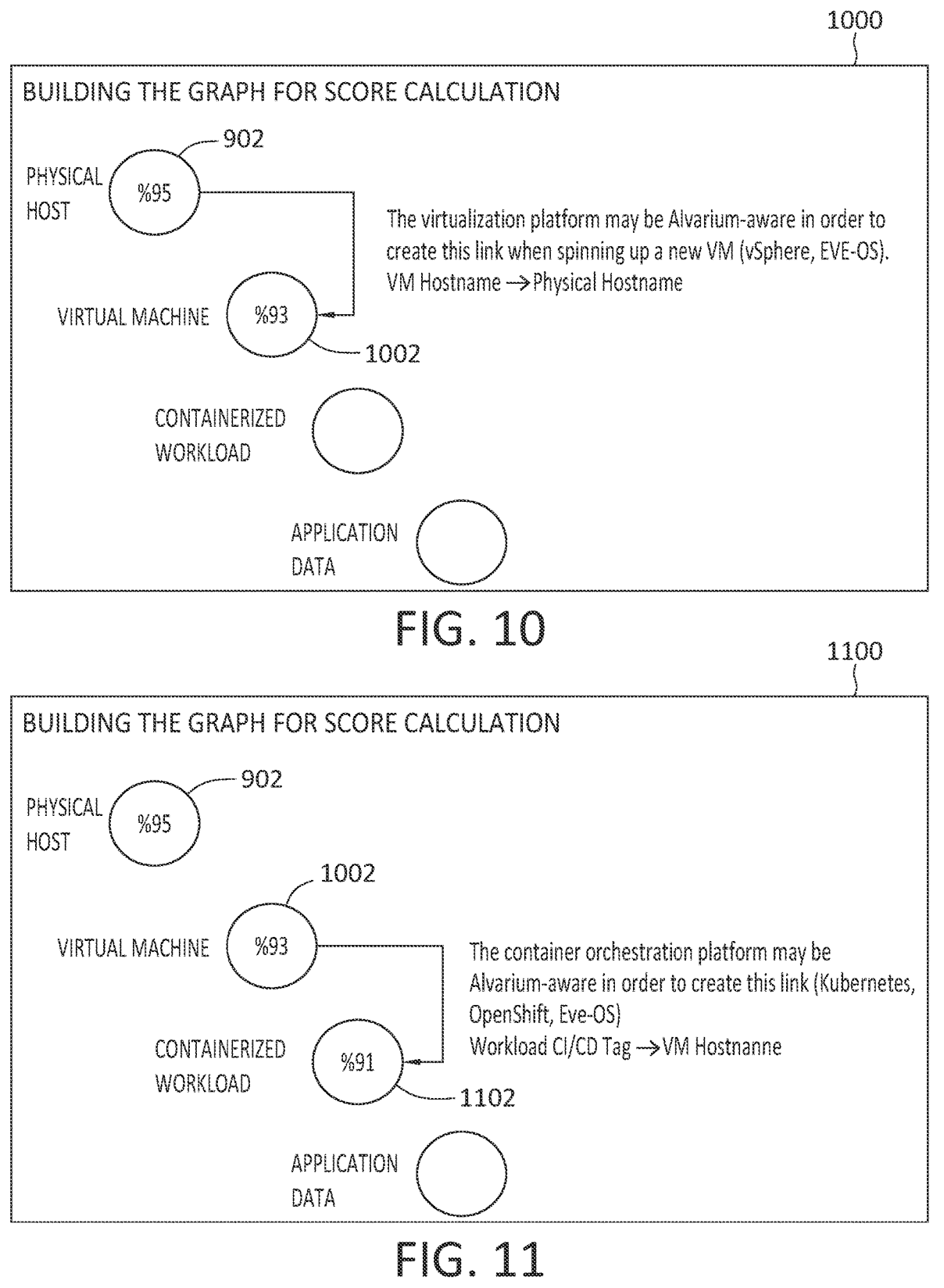

1000

BUILDING THE GRAPH FOR SCORE CALCULATION

902

PHYSICAL HOST   %95

The virtualization platform may be Alvarium-aware in order to create this link when spinning up a new VM (vSphere, EVE-OS). VM Hostname → Physical Hostname

VIRTUAL MACHINE   %93

1002

CONTAINERIZED WORKLOAD

APPLICATION DATA

BUILDING THE GRAPH FOR SCORE CALCULATION

902

PHYSICAL HOST   %95

1002

VIRTUAL MACHINE   %93

The container orchestration platform may be Alvarium-aware in order to create this link (Kubernetes, OpenShift, Eve-OS)
Workload CI/CD Tag → VM Hostnanne

CONTAINERIZED WORKLOAD   %91

1102

APPLICATION DATA

BUILDING THE GRAPH FOR SCORE CALCULATION

PHYSICAL HOST    %95    902

VIRTUAL MACHINE    %93    1002

CONTAINERIZED WORKLOAD    %91    1102

APPLICATION DATA    %85    1202

The application consumes the SDK and annotates in the existing manner. Annotation schema may be expanded to include container hostname and process name.

Data Key (Hash) –> Workload CI/CD Tag

SCORE CALCULATION VIA "CONFIDENCE GRAPH" TRAVERSAL

PHYSICAL HOST    %95    902

VIRTUAL MACHINE    %93    1002

CONTAINERIZED WORKLOAD    %91    1102

APPLICATION DATA    %85    1202

The described links enable construction of a graph indicating all layers of the deployment environment with associated confidence being measured for each. The Infrastructure layers condition the resulting confidence for the data.

For example, average the percentage scores of infrastructure layers and then multiply the score of the data on its own by this average. The closer the average is to %100, the less affected the data score.

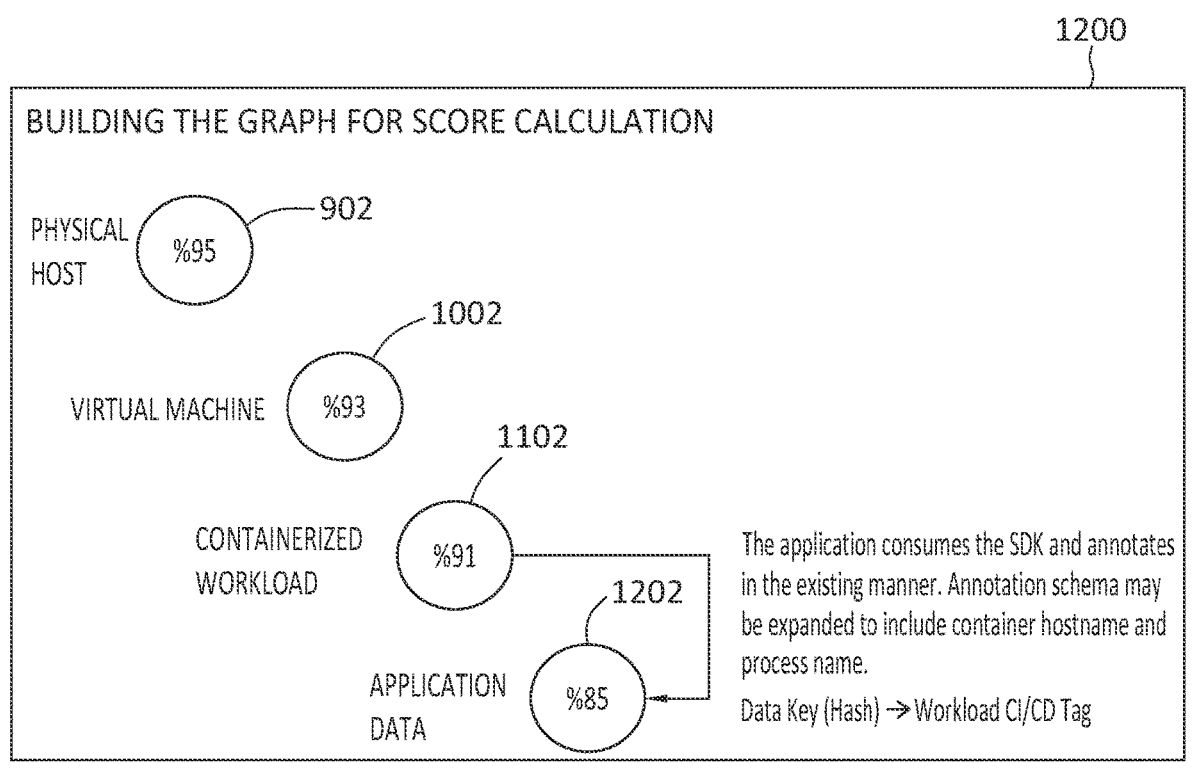

FIG. 13

DATA CONFIDENCE GRAPHS

FIELD OF THE INVENTION

Embodiments of the present invention generally relate to DCFs (data confidence fabrics). More particularly, at least some embodiments of the invention relate to systems, hardware, software, computer-readable media, and methods, for determining data confidence at multiple different levels of an application stack.

BACKGROUND

A DCF may annotate data with information concerning the trustworthiness of various nodes, and their components, of the DCF through which the data passes. However, this information typically only concerns the application layer of the DCF. At present, there is no DCF structure or process that obtains information concerning a DCF node infrastructure, and then annotates the data with that information.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 10 discloses calculating confidence score at the virtualization/OS layer.

FIG. 11 discloses calculating confidence score at the workload layer.

FIG. 12 discloses application of aggregate confidence information to DCF data.

FIG. 13 discloses calculating a final confidence score via graph traversal.

DETAILED DESCRIPTION OF SOME EXAMPLE EMBODIMENTS

Figure 1:
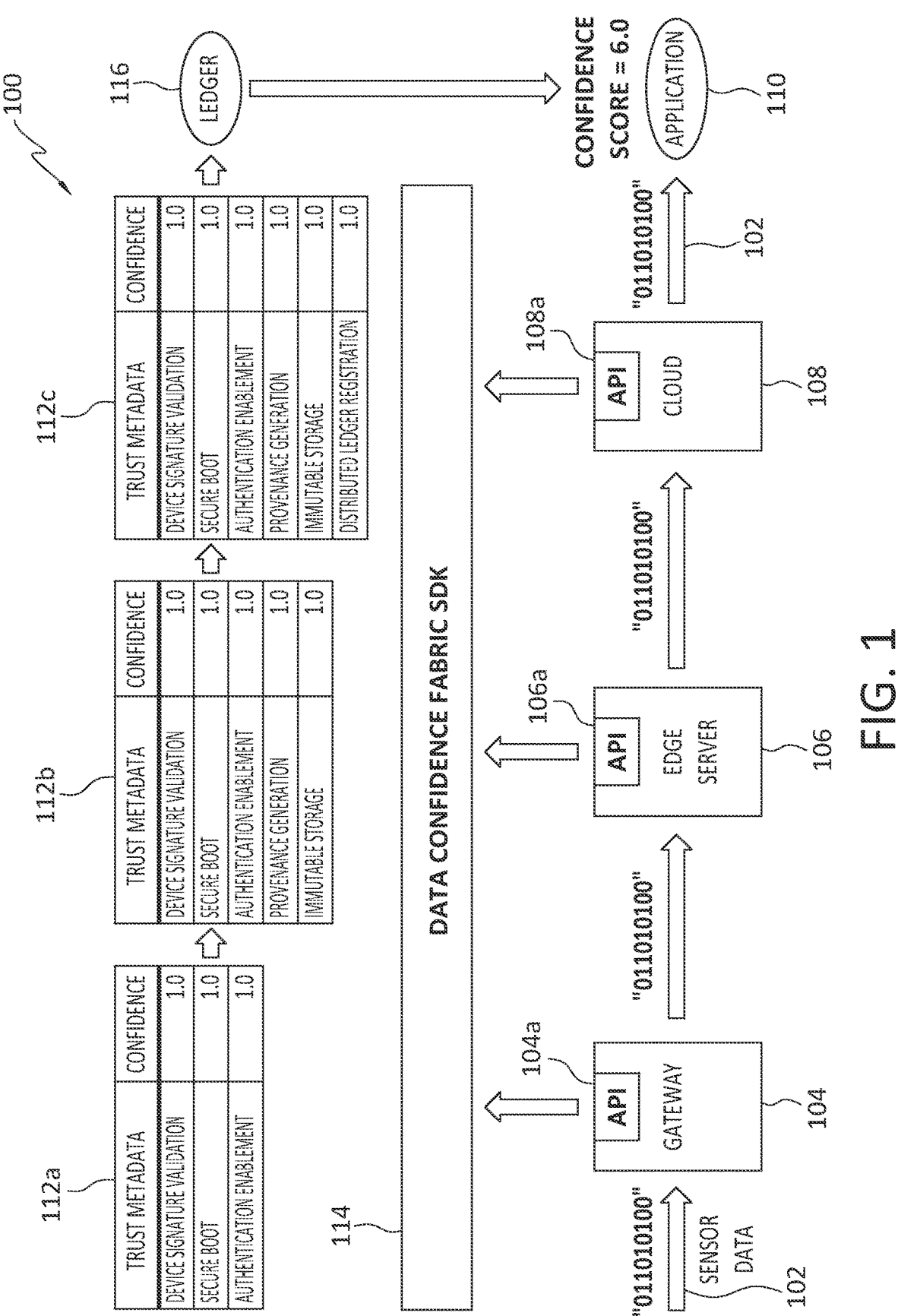
FIG. 1 discloses aspects of a DCF annotation and scoring framework.

Embodiments of the present invention generally relate to DCFs (data confidence fabrics). More particularly, at least some embodiments of the invention relate to systems, hardware, software, computer-readable media, and methods, for determining data confidence at multiple different levels of an application stack. In an embodiment, these levels may include hardware, OS (operating system), workload image, and data. Each subsequently higher layer of confidence may rely on, and be conditioned by, the assigned confidence score of the supporting layer(s).

One example embodiment comprises a method in which respective confidence scores are assigned at various infrastructure layers of a stack that is included in a DCF. The infrastructure layers may include, for example, a hardware layer, an OS/VM layer, and a container layer. As well, a containerized workload running on the container layer may be assigned a confidence score. Data traversing the DCF may be annotated with an overall confidence score that aggregates, or otherwise combines in some way, the respective confidence scores of the layers. An application, or other consumer, or potential consumer, of the data, may access this overall confidence score that has been annotated to the data. In an embodiment, the application may determine, based on that confidence score, whether or not to use the data. Because the confidence scores used to determine the overall confidence score have been calculated for subsequent data that transits the same infrastructure components and layers, those confidence scores may not need to be calculated again for future data streams, unless there is some material change to one or more of the infrastructure layers. In this way, there may be little or no need for continuous calculation, or re-calculation, of confidence scores for the infrastructure layers. As a result, the annotation of the data in the DCF may proceed relatively more quickly and efficiently, in terms of resource consumption for example, than if infrastructure layer confidence scores had to be calculated for each new workload.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that data confidence scores for infrastructure layers need not necessarily be calculated for each new workload of a DCF. An embodiment may provide visibility and traceability into confidence scores assigned at various infrastructure layers of a DCF. In an embodiment, an aggregate confidence score for an infrastructure on which a workload is running may be used to annotate data generated by the application with which the workload is associated. Various other advantages of one or more example embodiments will be apparent from this disclosure.

A. Aspects of an Example Architecture and Environment

The following is a discussion of aspects of example operating environments for various embodiments of the invention. This discussion is not intended to limit the scope of the invention, or the applicability of the embodiments, in any way. In general, embodiments of the invention may be implemented in connection with systems, software, and components, that individually and/or collectively implement, and/or cause the implementation of, a data confidence fabric (DCF).

With reference now to FIG. 1, embodiments of the invention may be implemented in a variety of operating environments, one example of which is a DCF, denoted at 100 in FIG. 1. In general, the DCF 100 may annotate and score any data that flows within it, providing increased confidence to the applications that use that data, such as for analytical purposes for example.

As shown in FIG. 1, the example DCF 100 concerns the context of edge-based use cases, but the scope of the invention is not limited to such cases or contexts. As shown in the example of FIG. 1, data such as sensor data 102 generated by a sensor flows through one or more tiers, or layers, of the DCF. In the illustrated example, the data 102 may flow through nodes such as a gateway 104, edge server 106, and cloud ecosystem 108, and may ultimately be consumed by one or more applications 110. As trusted handling of the data 102, at the nodes of the various layers, occurs during data 102 delivery, respective trust metadata 112a, 112b, and 112c may be associated with the data 102 by those nodes, that is, by the gateway 104, edge server 106, and/or, cloud ecosystem 108. Thus, trust metadata may continue to accumulate as the data 102 passes through the various nodes in its path.

The trust metadata 112a, 112b, and 112c, may comprise, for example, respective confidence scores associated with trust insertion processes performed by the nodes with respect to the data 102. The trust metadata 112a, 112b, and 112c may be associated with the data 102 by respective node APIs (Application Program Interfaces) 104a, 106a, and 108a that communicate with an interface 114 such as an Alvarium SDK (Software Development Kit). After the data 102 has transited the various nodes, the final, comprehensive trust metadata 112c may be entered into a ledger 116 which may make the trust metadata 112c available for use by the applications 110. Note that, in this example, the trust metadata 112c is an accumulation of all the trust metadata respectively added by the gateway 104, edge server 106, and cloud ecosystem 108.

To illustrate with reference to the specific example of FIG. 1, the gateway 104 may annotate, to the data 102, respective trust metadata 112a for each of three different operations. Particularly, the gateway 104 may annotate trust metadata 112a that indicates, among other things: the gateway 104 has successfully validated the signature coming from the device that generated the data 102; the gateway 104 has used a TPM chip to confirm that the BIOS, firmware, or O/S on the gateway 104 was tampered with during boot; and, the gateway 104 is currently running authentication/authorization software to protect the data 102 stream from unwanted inspection or access. With continued reference to the trust metadata, including the trust metadata 112a, a Confidence score of "1.0" means that a trust insertion process, such as the secure boot confirmation for example, operation succeeded, while a score of "0," for example, might indicate that signature validation failed, or was not performed for some reason.

As noted earlier, the DCF metadata, that is, the trust metadata 112a, ultimately arrives at the ledger 116, where a ledger entry may be created that permanently records the contents of the trust metadata 112a table as well as an overall confidence score, which is 6.0 in this illustrative example. Note that the equation used to calculate the confidence score in the example of FIG. 1 is simply a summation of confidence scores, but other approaches to calculating an overall confidence score may alternatively be employed.

A useful aspect of the example DCF 100 is that, as a result of the annotation of trust metadata 112a, 112b, and 112c, the application 110 may have access to additional context about the trustworthiness of the data 102, addressing the problem of potentially untrustworthy or malicious data sources. The problems presented by such data sources are increasingly faced by enterprise customers as they move their business logic closer to non-enterprise, and potentially untrustworthy, data sources at the edge and/or elsewhere. In the example DCF 100, the path of the data 102 may be largely software-dependent, in the sense that data path handling software, which may comprise a respective instance at each of the gateway 104, edge server 106, and cloud ecosystem 108, may call an annotation/scoring API 104a, 106a, and 108a, respectively, and routing software may be provided at these nodes that forwards the annotations along the data path.

Finally, the example of FIG. 1 is primarily concerned with an application layer of the DCF 100. However, and as disclosed herein, the same, or similar, principles that govern data annotation in the DCF 100 may be applied as well to various infrastructure layers, not shown in FIG. 1 but disclosed elsewhere herein, of the DCF 100. Such infrastructure layers may include, for example, a hardware layer, an OS/VM layer, and a container layer.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Context for an Example Embodiment

With continued reference to the example of FIG. 1, various layers of trust may be provided in the DCF 100. For example, the gateway 104 may have an embedded Intel TPM (trusted platform module) chip and it may use that chip to perform trust services on behalf of the owner of the data. In this, a secure boot annotation indicates that the gateway 104 has not been tampered with. The TPM could also provide keys used to perform signature services on the data.

As another example, the edge server 106 may leverage an Intel Secure Enclave as a trust service that keeps sensitive data 102 private. Further, the cloud application 108, such as, for example, the Dell Streaming Data Platform, may perform additional trust services on the data 102. For example, the cloud application 108 may inspect the data 102 for drift if the data 102 is coming from a sensor with a well-known range of values and/or a long history of stable, or unstable, behavior.

The recipient, or beneficiary, of these trust services, such as the data owner for example, may require this level of trust insertion in order that their applications can produce insights from the data with adequate confidence. The trust insertion may be of great value because it may significantly reduce operational risk from faulty execution of an application resulting from the consumption of low-quality, erroneous, or malicious data. Trust services may also significantly reduce the risk of regulatory compliance violations. Preventing these violations may enable trust service recipients or customers to avoid regulatory fines.

In considering a DCF, such as the DCF 100 for example, it may be thought of operationally as a vector since data points are captured as data linearly traverses an eco-system at the application layer. This may lead to some potential opportunities for improved functionality, as exemplified in one or more of the disclosed embodiments, and discussed below.

Consider, for example, the presence of an onboard TPM device used to manage secrets for hardware integrity, or keys for IAM (Identity and Access Management). In a conventional approach, a DCF may check for the existence of a TPM with each call to annotate a piece of data. In an embodiment however, this check only needs to be done once, at the time a given host boots up. The presence, or not, of a TPM in a DCF is unlikely to change from one data-related operation to the next.

Figure 2:
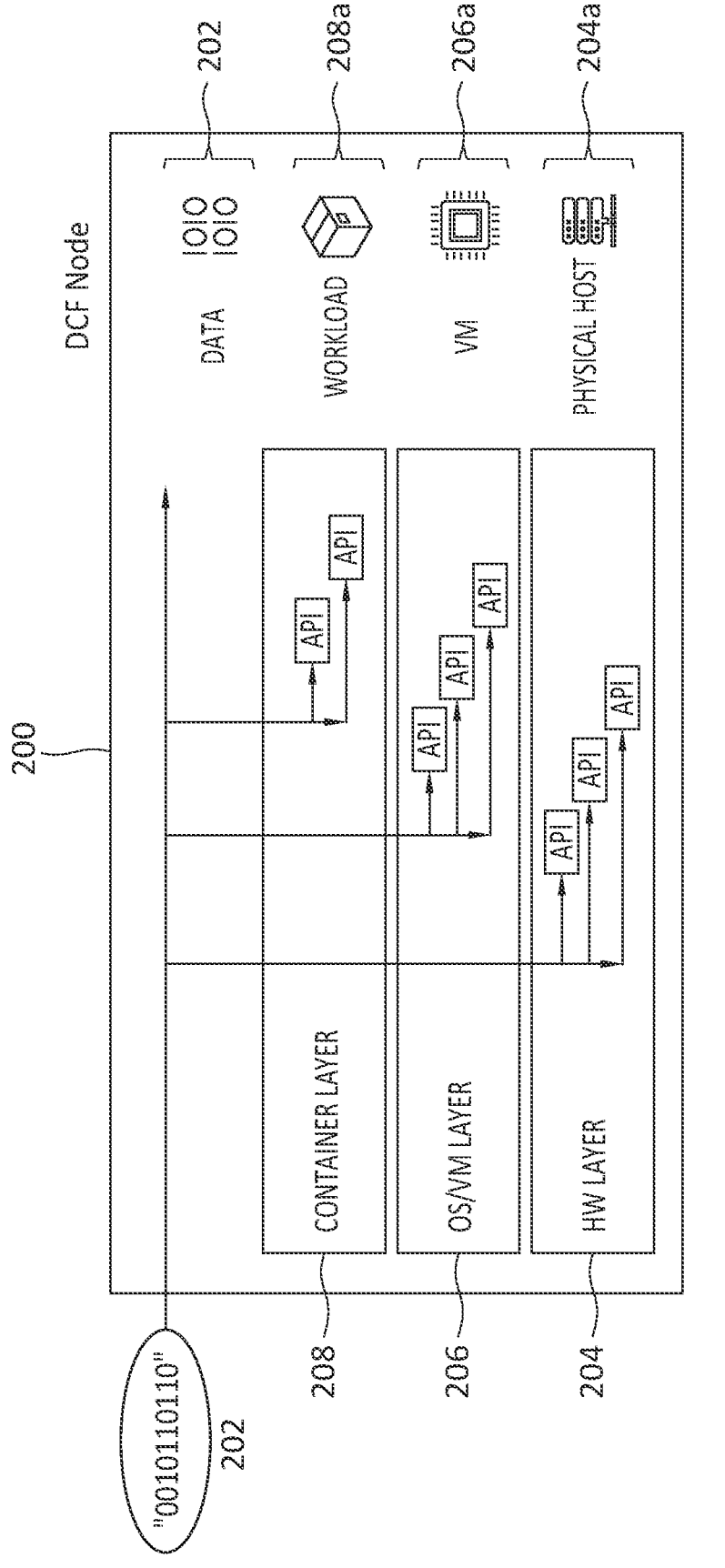
FIG. 2 discloses multiple DCF annotations at multiple layers.

With reference now to FIG. 2, a an example of a possible DCF node 200 configuration is provided for comparative purposes. The example DCF node 200, such as a gateway, edge server, or cloud service, for example, disclosed in FIG. 2 highlights a need for multiple annotation touch points across multiple layers, also referred to herein as 'infrastructure layers,' of a DCF node whenever data 202 flows into the system. In the diagram, calls for annotation are performed by calling an API provided by the Alvarium SDK (software development kit). More generally however, this, or another, SDK may be employed for this annotation purpose at lower levels of the infrastructure stack and, as such, the foregoing is provided only by way of illustration. As well, it is noted that because metadata such as the confidence scores may be gathered from various levels of the stack in a particular order, location of the SDK at other layers may be implemented in a way that is consistent with the scheme by which the confidence scores are gathered.

The infrastructure layers of the DCF node 200 may comprise, for example, an HW (hardware) layer 204, an OS (operating system)/VM (virtual machine) layer 206, and a container layer 208. As shown, the HW layer 204 may comprise a physical host 204a, the OS/VM layer 206 may comprise a VM 206a, and the container layer 208 may comprise, or run, a workload 208a.

With continued reference to the example of FIG. 2, it can be seen that, were such a configuration to be implemented, it would require continual query of the HW layer 204 for every data 202 packet. Particularly, every time a piece of data 202 flows into/through the DCF node 202, that data 202 may be handled by a secure, trusted hardware component.

For example, a TPM chip may perform signature-related activities, or a secure enclave may encrypt/decrypt the data for use in a trusted environment. This situation might be addressed by interrogating the hardware that generates data confidence annotations. However, each interrogation of an identical kind for every piece of data created or otherwise handled by an application would increase, possibly significantly, the number of computation cycles. Repeated calls in this manner could slow down the system significantly and cause undue consumption of resources such as, but not limited to, communication bandwidth, CPU cycles, and memory. Thus, an embodiment may avoid the need for such continual interrogation of the HW layer.

With continued reference to the example of FIG. 2, such a DCF node 200 may imply continual querying of an HW bill of materials. For example, the DCF where the DCF node 200 may be deployed may be unaware of the provenance of any given hardware component currently present in the stack. Provenance in the form of a BOM (Bill of Materials) of a component may be an important factor in confidence metadata generation. In a configuration such as shown in FIG. 2, however, calculating BOM confidence would require one or more extra calls to gather information needed to build the confidence score. Again, an embodiment may reduce, or eliminate, the need for such extra calls.

Similarly, in the node 200, continual query of the OS-layer/VM layer would likely be required for every data packet. That is, and similar to the hardware query referred to above, the DCF may trigger continual calls to the OS or to some other trustworthy piece of software providing trust functionality, where such functionality might include, for example, encryption, signature operations, results of trusted boot, and the presence, or not, of AuthZ/AuthN SW. Information may also include trusted/signed OS image running on the VM, patch levels, and anti-virus detection, for example. In addition, if a VM is running, the VM would need to establish a relationship with the underlying hardware in order for confidence to be established. While these calls into the OS may be less expensive than calls into the hardware counterparts, they also may slow down the system significantly. Further, the DCF implementation, including the node 200, does not have any information at all from this layer. Thus, an embodiment may not only obtain confidence information from, and/or about, the OS-layer/VM layer, but may do so only on an as-needed, rather than ongoing, basis.

As a final example, and with continued reference to the example of FIG. 2, an embodiment may eliminate any need for continual query of the application/workload for every data packet. Particularly, as data is handled by an application, there may be a requirement for the application/workload to annotate information about the trustworthiness or lineage of that application. If the workload is running on a VM, such as the layer 206 in FIG. 2, it must have visibility to the VM it is running on, but in the example of FIG. 2, there is no way to measure the confidence of that underlying VM.

As described above, example embodiments may provide one or more useful functionalities. Particularly, an embodiment may comprise a Data Confidence Stack approach, as discussed below.

C. Detailed Discussion of Aspects of an Example Embodiment

C.1 Overview

Consider the presence of an onboard TPM device used to manage secrets for hardware integrity or keys for IAM. As noted earlier, an embodiment may perform a check for the existence of a TPM at the time a given host boots up, and not for each call to annotate a piece of data. This is because, for example, the presence, or lack, of a TPM is unlikely to change from one data-related operation to the next.

Figure 3:
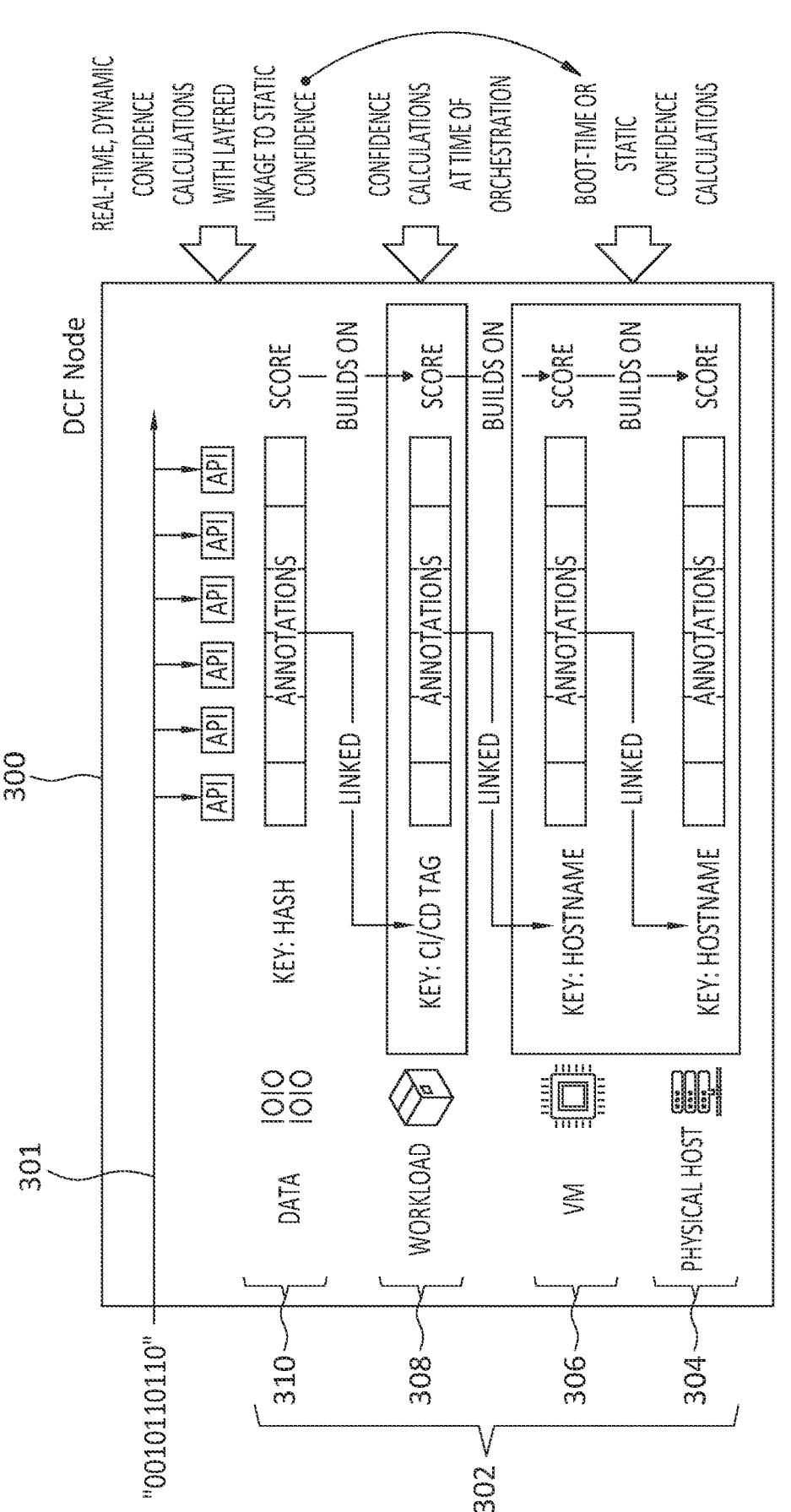
FIG. 3 discloses real-time DCF annotations leveraging boot-time (static) confidence scoring.

Streamlining annotation, for example, the presence of a TPM, may require a mechanism to capture confidence-related metadata at a lower level of the stack, such as a physical host. Further annotations for a given host may be collected and evaluated against a policy to establish a confidence score for the host. This score may then condition confidence in all of the layers above it, that is, from a VM to containerized workload to the application within the container. Thus, confidence may be considered in terms of a graph representation in which entities at all levels of the infrastructure become "first class citizens" with relationships to one another, working to establish a measure of confidence at each level. FIG. 3 provides a visual representation of annotation capture using a "Data Confidence in the Stack" approach in a DCF node 300.

In particular, the example of FIG. 3 discloses real-time DCF annotations leveraging boot-time, that is, static, confidence scoring. As shown in FIG. 3, real-time annotation of data 301 may occur at the highest level of a stack 302 that includes various layers such as, for example, a physical host 304, VM 306, workload/container 308, and application layer 310. Further, confidence at that highest level, that is, the application layer 310, may be influenced from previously calculated, and possibly unchanging, that is, static, or only infrequently changing, confidence scores. These static confidence scores may be generated, at boot time for example, for the layers that include the physical host 304, VM 306. In an embodiment, the static scores may be determined before, or after, boot time, and not necessarily at boot time. Thus, in this example, the confidence scoring/annotation for an incoming piece of data 301 may be influenced by the previously calculated confidence scores of, respectively, the physical host 304, VM 306, and the workload/container 308. In an embodiment, the respective hardware 306 and VM 308 confidence calculations may be performed at boot time, while container or workload 308 calculations may be performed at orchestration time for the workload 308 or container. That is, the scoring for a workload may be based on annotations captured at the time the artifact is built, such as with a Continuous Integration (CI) pipeline. That score may then be operationalized via an orchestrator that evaluates it against a policy to determine whether the artifact should be deployed (CD).

In an embodiment, an orchestrator will map a workload 308 to the VM 306 it is running on. The workload may be informed of the VM hostname or IP address in some manner such as environment variable injection at runtime. The workload 308 may be identified by its CI/CD build tag which may, in turn, be linked to a Software Bill of Materials (SBoM). Finally, an application enabled by the Alvarium SDK may link its data confidence annotations to the source workload 308. This may be facilitated by making the CI/CD build tag available to the application at startup. This may be done via environment variable, command line, or other approach. The process of scoring these annotations gives operators visibility into confidence at each layer of the stack 302. It becomes possible to see, for example, that a workload of confidence 'X' was deployed to a VM with confidence of 'Y' on a host with confidence of 'Z.' Thus, 'X,' 'Y' and 'Z' then condition, or influence, the confidence of all application-related data 301 handling, and the application is able to determine, and/or access, a combined confidence score that accounts for all the layers in the stack 302, or at least selected layers of the stack 302. Thus, an application may be able to obtain a deeper and more nuanced confidence score for the data 301 than would be obtained if only the components at the application layer, such as a gateway, edge server, and cloud service, for example, were queried for confidence information.

C.2 Boot-Time Calculation of Hardware Confidence

In an embodiment, the physical host, see 304 in FIG. 3 for example, may be the fundamental, bottom-most layer of the stack and has cardinality. In an embodiment, it may be possible to research linkage to the existence of an HBoM (Hardware Bill of Materials), such as may be employed by government customers, for example, and capture that as a confidence factor.

During a boot process, some or all trust-related hardware features may be discovered and annotated by calling a DCF API such as the Alvarium SDK for example. This hardware-related confidence information may be used to generate a hardware confidence score, such as 95% for example, and static confidence annotations may be calculated for that hardware at boot time. This contrasts with an approach in which a confidence score may only be calculated in the context of annotating a data stream at the application layer.

Figure 4:
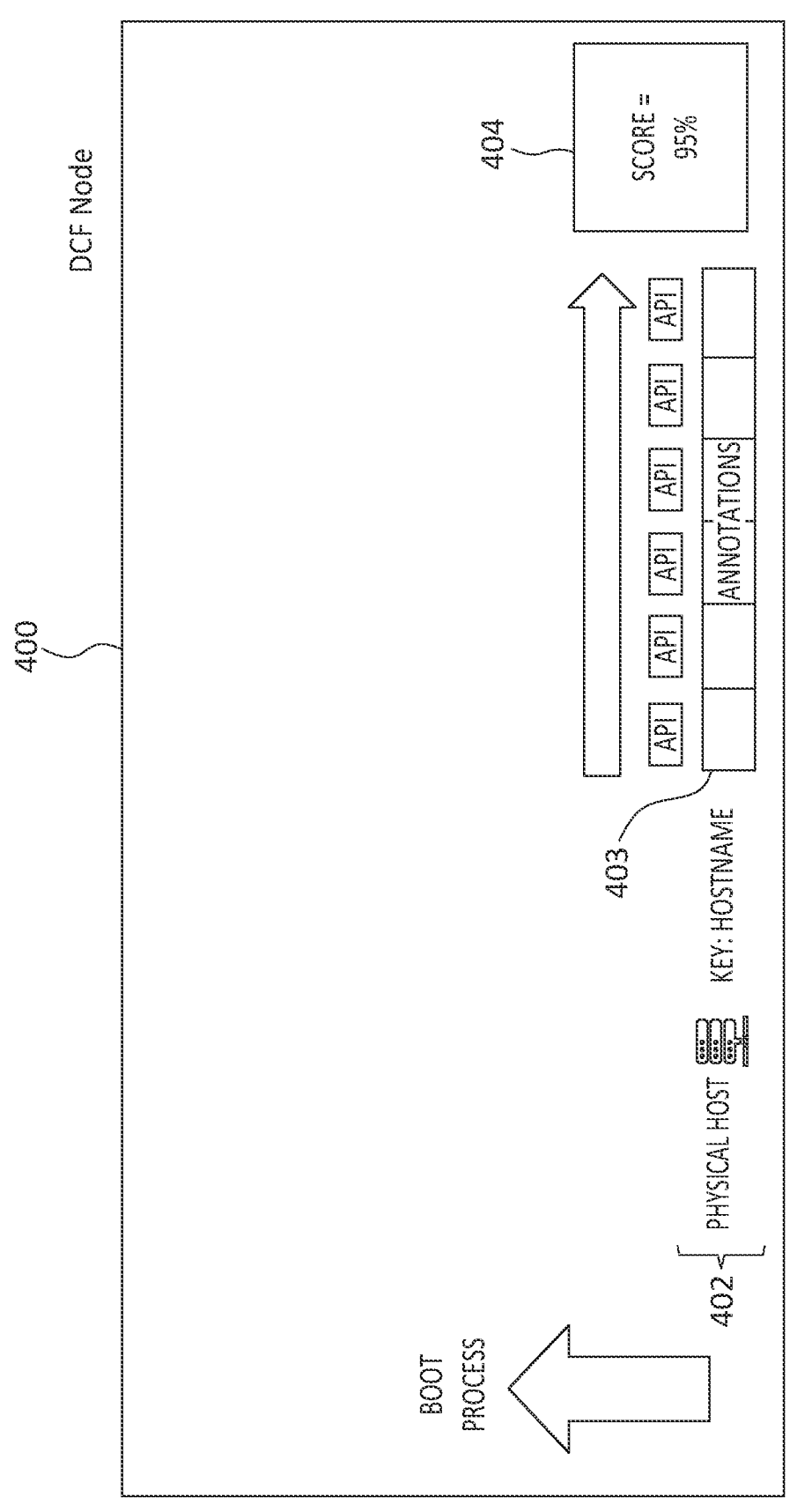
FIG. 4 discloses annotating HW confidence at boot time.

In an embodiment, the hardware confidence annotations may be tied or bound to a unique ID such as, for example, a hostname or other identifier unique to the hardware. This unique ID may enable other higher-level, that is, at higher layers in a stack, confidence calculations to link down, or gain visibility, to these annotations and scores. FIG. 4 highlights one example of this boot-related approach implemented in connection with a DCF node 400, where all of the discoveries and annotations 403 captured in the hardware layer 402 results in a 95% confidence score 404, perhaps, for example, because something such as BOM lineage information was undiscovered.

C.3 Boot-Time Calculation of OS/VM Confidence

In addition to gathering hardware-related confidence information, during the boot process, the OS itself may take inventory of trust-related confidence features. Such features may be related to, for example, whether the device has been securely onboarded, whether there is a trusted/signed OS image running on the VM, and whether or not the OS or VM experienced processes such as measured boot process, patch levels, and anti-virus detection.

Figure 5:
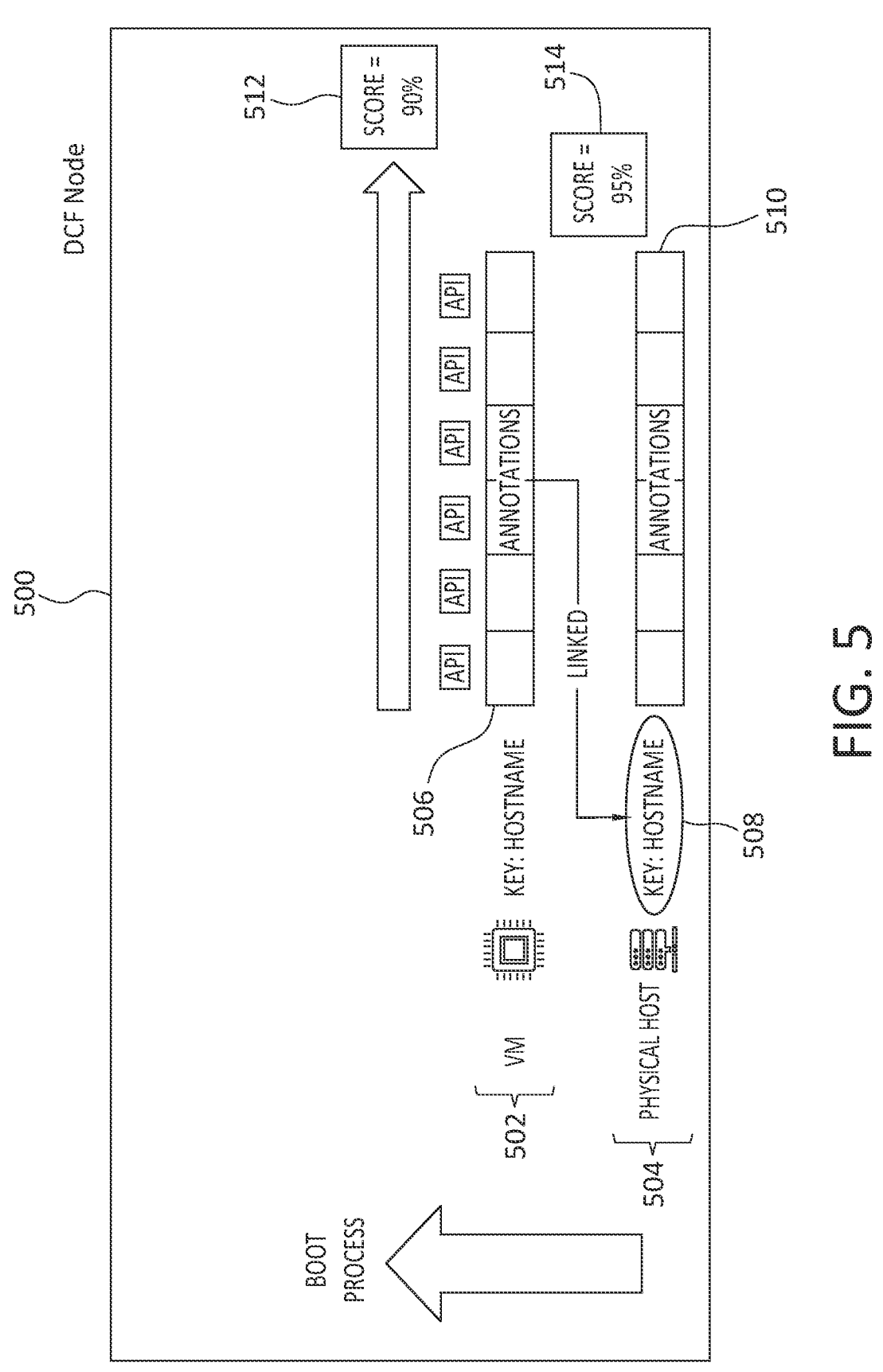
FIG. 5 discloses annotating OS or VM confidence at boot time.

To obtain this confidence information, and with reference to the example DCF node 500 of FIG. 5, the VM or OS layer, as applicable, 502 may have visibility into which host 504 it is running on, as well as access to the confidence score for the hardware of that host 504. Assuming that visibility, annotations 506 attesting to confidence in the VM or OS layer 502 may include the underlying hostname 508 in order to establish the relationship between the hardware of the host 504 and the confidence information or annotations 510. In an embodiment, a VM or OS identifier may also be included as part of the information that may be used to establish that relationship. It is noted that the final confidence score 512, 90% in the example of FIG. 5, may be based on the linked score 514 to the hardware of the physical host 504 and/or may be based on annotations about the VM or OS layer 502 itself, for example, annotations indicating that no anti-virus capability was detected in the VM or OS layer 502. In an embodiment, confidence annotations about the VM or OS layer 502 may be associated with the VM or OS layer 502 at boot time, that is, when the VM or OS layer 502 is booted.

C.4 Install-Time Calculation of Workload Confidence

Figure 6:
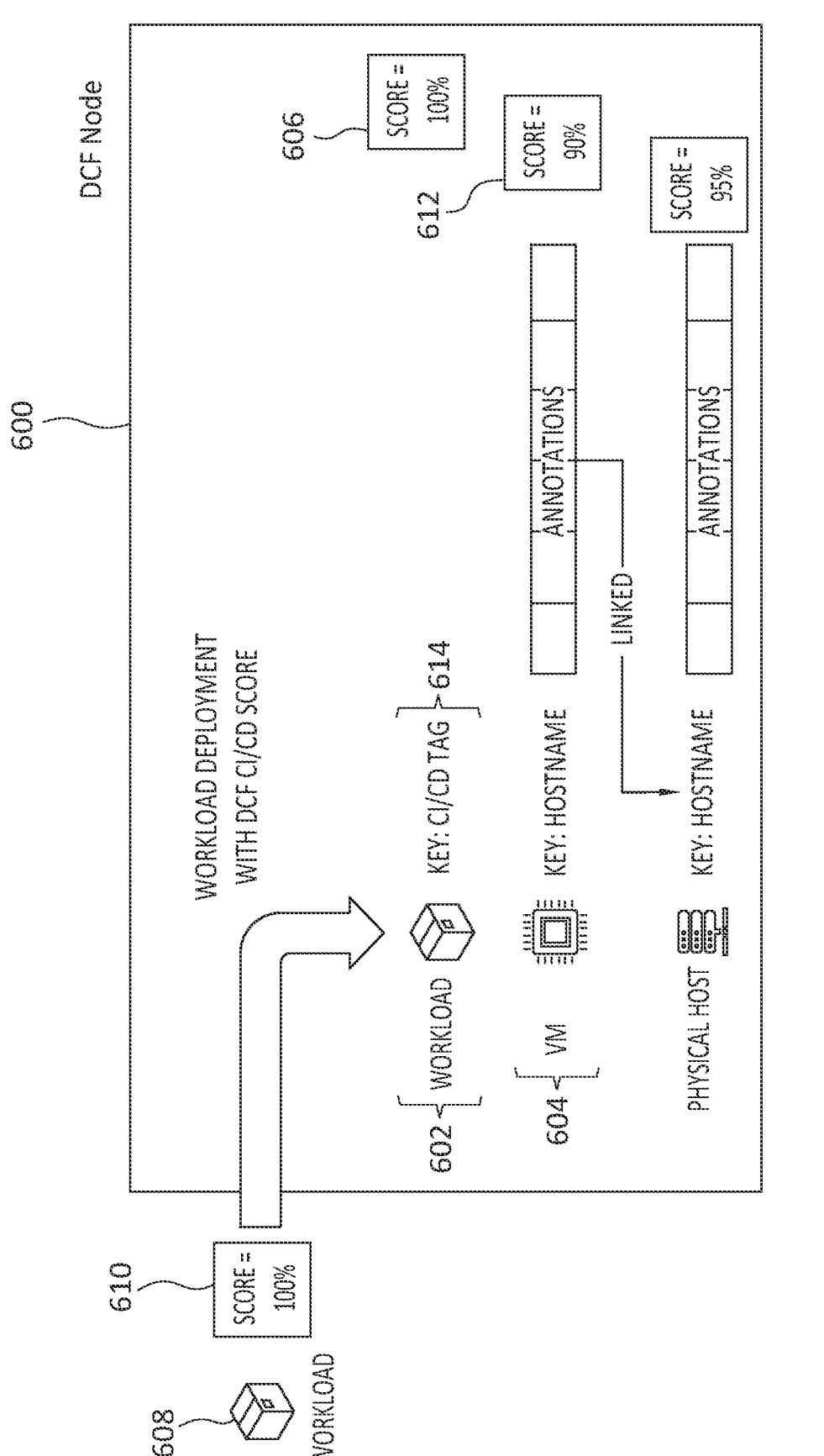
FIG. 6 discloses a DCF-enabled workload layer.

In an embodiment, and with reference to the example DCF node 600 disclosed in FIG. 6, the next part of a layered approach to confidence assignment and aggregation may take place at a workload layer 602. In particular, FIG. 6 discloses that when a workload 602 is loaded, or layered, on top of an OS or a VM layer 604, the workload layer 602 may already have a data confidence score 606 that was generated, for example, during a CI/CD (continuous integration and continuous deployment) pipeline.

With continued reference to the example of FIG. 6, the left-hand side shows a workload 608 being deployed to a DCF node. In this example the workload has a confidence score 610 of 100%, possibly indicating that the end-to-end CI/CD pipeline was 100% secure when the software manufacturer assembled this workload 610. The workload or container deployment process layers this level of confidence by linking it to the underlying VM confidence score 612, which is 90% in this example. Note that, in an embodiment, the workload 608 comes with a unique CICD tag 614, so that the data confidence calculation, discussed below, can layer the confidence scores accordingly.

C.5 Real-Time Calculation of Data Confidence with Layered Referencing

Figure 7:
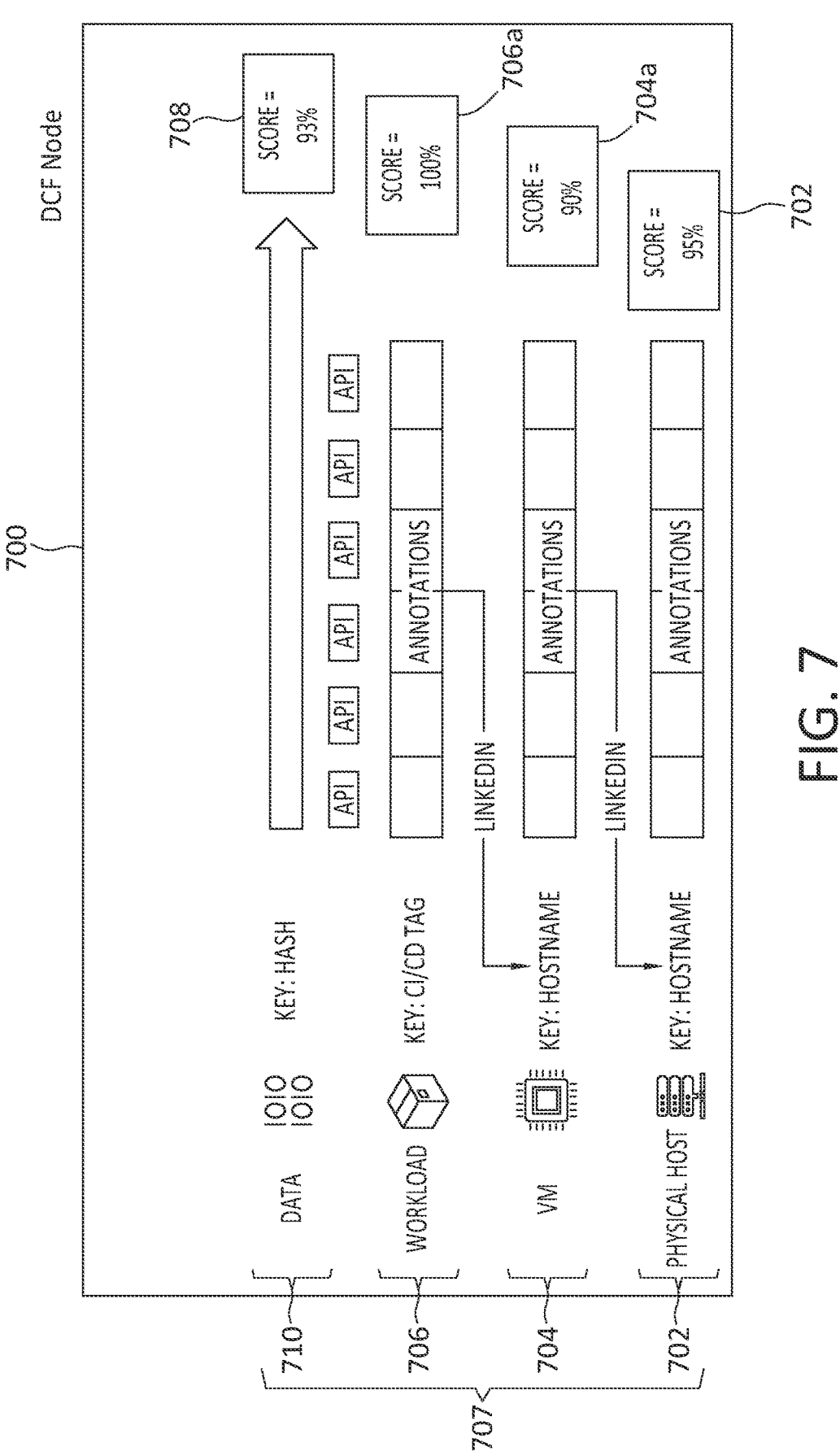
FIG. 7 discloses data stream annotation leveraging layered confidence.

With all of the layers in place, and respective confidence scores assigned to the layers, a runtime annotation for the data stream may be implemented without the need to continually dive down into the lowest layers of the stack. The annotation may be linked to the given data stream using the data hash value, and the data stream is also aware that it is being handled by a specific workload with a unique CICD tag. FIG. 7 discloses an example of this approach.

In particular, FIG. 7 discloses an example of data stream annotation that leverages layered confidence from layers below. The example DCF node 700 in FIG. 7 includes various layers 702, 704, and 706, that collectively define a stack 707, and all of which have been assigned respective confidence scores 702a, 704a, and 706a. These scores have been aggregated to generate an overall confidence score 708 for the infrastructure, which may be used to annotate the data 710 passing through the DCF node 700. Thus, a benefit of one example embodiment may be increased performance and operational efficiency in that the embodiment may only need to capture the annotations for the existence of primitive members 702, 704, and 706, in the stack 707 once, as opposed to each time the DCF node 700 handles a piece of data 710.

Note that in some instances, it is possible that confidence score(s) for a layer, or layers, may be unavailable for some reason. Thus, an embodiment may comprise one or more mechanisms for addressing this circumstance. For example, when a confidence score is unavailable, such as a relatively heavily weighted or relatively more important confidence score for example, the process may terminate, and issue an error message indicating that the process terminated due to lack of availability of one or more confidence scores, such that an overall confidence score could not be calculated, or would not be accurate if calculated. As another example, the process may continue to run even if a confidence score is unavailable, and issue a warning, such as assigning a tag to the overall confidence score, that the set of confidence scores to be used for calculating the overall confidence score is incomplete, and the overall confidence score may be inaccurate in some respect. In an embodiment, such as one in which confidence scores for the layers are weighted, the lack of a lightly weighted, or relatively less significant, confidence score may not be an impediment to calculation of a useful overall confidence score. In this case, the overall confidence score may be calculated without the missing confidence score. A warning may still be issued in this case so that an administrator or other entity can investigate the reason for the missing confidence score. Note that the aforementioned weights and importances may be assessed and determined relative to the respective weights and/or importances of one or more other confidence scores.

D. Illustrative Example

Figure 8:
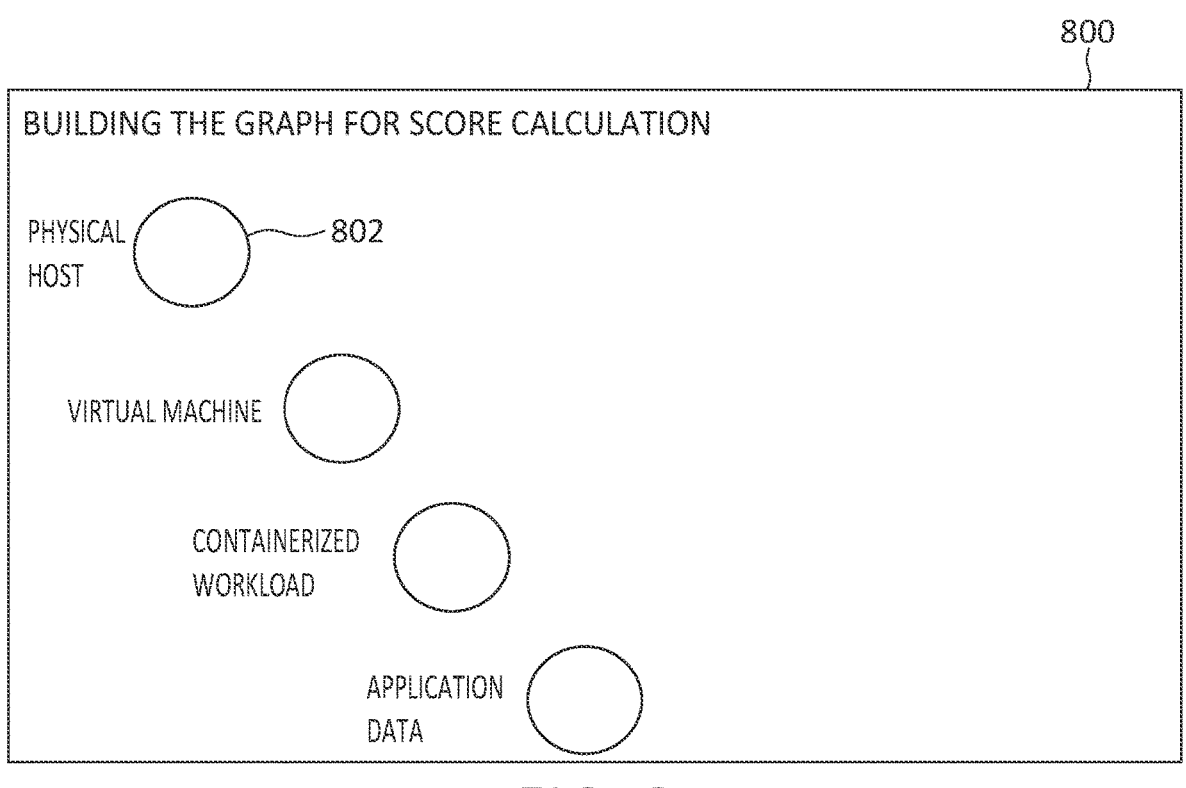
FIG. 8 discloses an uninitialized data confidence graph.

Aspects of an example embodiment may be considered in the context of a data confidence graph, an example of which is identified at 800 in FIG. 8. Note that the DCGs respectively disclosed in FIGS. 8-13 may all be the same as each other, except as may be noted in the discussion of the DCGs. That is, FIGS. 8-13 disclose successive, respective, operations in an overall process for calculating, and applying, confidence scores.

In an embodiment, the DCG (data confidence graph) concept may comprise the writing of annotations into a distributed ledger, and may also comprise creation of a DCG view model, which may enable the ready querying of the underlying layers of a DCF node. FIG. 8 discloses an example of an un-initialized DCG at 800.

Once the un-initialized DCG 800 has been defined, a physical host 802 may be on-boarded. In an embodiment, the open-source EVE-OS operating system may be used for this purpose. During boot time, EVE-OS may check for the existence of hardware trust mechanisms, such as a hardware bill of materials, and TPM, for example, and may calculate a confidence score based on the completeness of this discovery. For example, if an expected or needed hardware trust mechanism is not found during onboarding, that will be reflected by a lowered confidence score. The onboarding device then attests to the presence of the mechanisms that are found by sending a message to the EVE-OS controller.

In an embodiment, the two locations where DCG functionality may be added to this environment are (a) on the device where the EVE-OS hardware discoveries can be made, or (b) on the EVE controller where the attestations are received. In either case, the root node, the physical host 802 in this example, of the DCG 800 may be created and initialized with a score.

Figure 9:
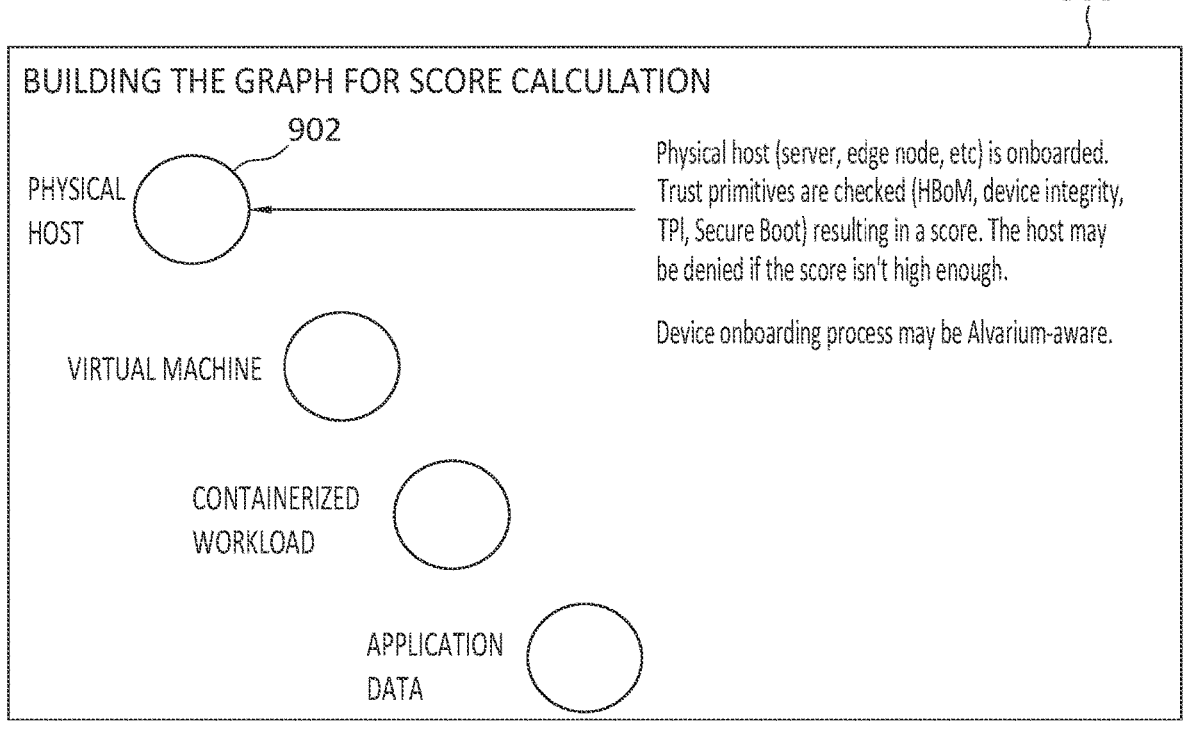
FIG. 9 discloses calculating confidence score at the HW layer.

FIG. 9 discloses an example of this approach, namely, a DCG 900 showing the calculating of a confidence score, 95% in the illustrated example, for an HW layer 902. Along with this score, an identifier unique to the hardware of the HW layer 902 may also be stored. Such identifiers may include, for example, a serial number, a certificate, or a unique hostname.

Next, a confidence score may be calculated for the virtual machine, or an OS layer, as applicable, as shown in the DCG 1000 of FIG. 10. In an embodiment, this may comprise adding DCG functionality somewhere in an EVE-OS architecture, such as in the virtualization logic that EVE uses to isolate and execute workloads.

In more detail, the example of FIG. 10 discloses the initialization of a VM 1002 with a score in the DCG 1000, linking that score to the underlying hardware unique identifier. Note also that the VM 1002 may assign itself a unique virtual identifier. Further, as disclosed earlier herein, this approach may be employed for a VM environment, as well as for an OS running in a non-virtualized configuration.

Next, and with reference now to the DCG 1100 disclosed in FIG. 11, a workload 1102 may be deployed on top of EVE-OS. In an embodiment, EdgeX Foundry may be employed as the workload 1102, although the scope of the invention is not limited to any particular type of workload(s). In an embodiment, the workload may be built by instrumenting a CI/CD pipeline, such as the Jenkins Pipeline for example, for the workload with DCF/Alvarium annotations, resulting in a confidence score for an application image, such as a Docker image for example. This confidence score may then be associated with a Docker image build tag.

In order to then integrate the workload with the DCG 1100 framework, the workload orchestration framework, such as Kubernetes, OpenShift, or Eve-OS for example, may be modified to be Alvarium-aware, and the CICD tag and score then linked to the unique VM confidence graph, for example, the VM-hostname, node during deployment. In this way, a policy may be used govern the deployment of workloads into a secure operational environment only if the verifiable confidence of the workload(s) meets or exceeds a defined threshold. In FIG. 11, the resulting DCG 1100 is shown as it is configured after performance of the deployment and linkage of the workload 1102.

Turning next to FIG. 12, the example DCG 1200 shows that the application, such as the containerized workload 1102, running within the container may consume the Alvarium SDK and perform data annotation as usual. The annotation schema may be extended to include a property for linkage to the image build tag for the supporting container.

With the various operations of FIGS. 8-12 in place, an embodiment may comprise an approach for score calculation based on confidence graph traversal. FIG. 13 discloses one example method in action. In particular, FIG. 13 discloses calculating a final overall confidence score, such as may be applied to data passing through one or more nodes of a DCF, by way of a DCG 1300 traversal.

Various approaches may be used to calculate an overall confidence score of an infrastructure, such as a DCF node infrastructure for example, through which data may pass, and the scope of the invention is not limited to any particular approach. One example approach, disclosed in FIG. 13, involves averaging the various respective scores of the layers. As shown in FIG. 13, each layer may have visibility into one, or all, of the layers below it so that the layer may obtain confidence scores for each of those layers. In an embodiment, the respective scores may, additionally or alternatively, be weighted in some way. For example, the scores may be weighted according to their relative importance to the overall score. To illustrate, the score obtained by secure infrastructure may be more important than the score from the CI/CD pipeline, and those two scores may be weighted accordingly.

In an embodiment, the overall confidence score may be calculated by/at a DCF node. The score may then be applied, by that DCF node, to data that is handled by the DCF node.

E. Example Methods

It is noted with respect to the disclosed methods, including the example methods individually, and collectively, disclosed in FIGS. 8-13, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. Further Example Embodiments

Following are some further example embodiments of the invention. These are presented only by way of example and are not intended to limit the scope of the invention in any way.

Embodiment 1. A method, comprising: in a node of a data confidence fabric (DCF), the node comprising hardware, obtaining, when available, a static confidence score for a lowermost layer of an infrastructure of the node; after a workload is orchestrated to the node, obtaining, when available, a workload confidence score; when the static confidence score and the workload confidence score are available, aggregating the static confidence score and the workload confidence score together to obtain an overall infrastructure confidence score; and applying, by the node, the overall infrastructure confidence score to data passing through the node.

Embodiment 2. The method as recited in any preceding embodiment, wherein when one, or other, of the static confidence score and the workload confidence score is not available: the overall infrastructure confidence score is obtained by aggregating a confidence score corresponding to another layer with which ever of the workload confidence score and the static confidence score is available; and/or the overall infrastructure score is tagged as missing information.

Embodiment 3. The method as recited in any preceding embodiment, wherein the lowermost layer comprises a hardware layer, and the infrastructure further comprises an operating system/virtual machine layer, and a workload environment layer in which the workload is performed.

Embodiment 4. The method as recited in any preceding embodiment, wherein the static confidence score is obtained by calculating the static confidence score, and the static confidence score calculation is performed when the node is booted.

Embodiment 5. The method as recited in embodiment 2, wherein the another layer is an operating system/virtual machine layer.

Embodiment 6. The method as recited in any preceding embodiment, wherein the lowermost layer comprises a physical host.

Embodiment 7. The method as recited in any preceding embodiment, wherein the aggregating is performed by the node.

Embodiment 8. The method as recited in any preceding embodiment, wherein the overall infrastructure score is applied to the data in real time as the data is passing through the node.

Embodiment 9. The method as recited in any preceding embodiment, wherein the obtaining of the static confidence score comprises calculating the static confidence score, and the static confidence score is not recalculated for a subsequent data stream that passes through the node.

Embodiment 10. The method as recited in any preceding embodiment, wherein a confidence score of a layer conditions confidence in any and all layers about the layer.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
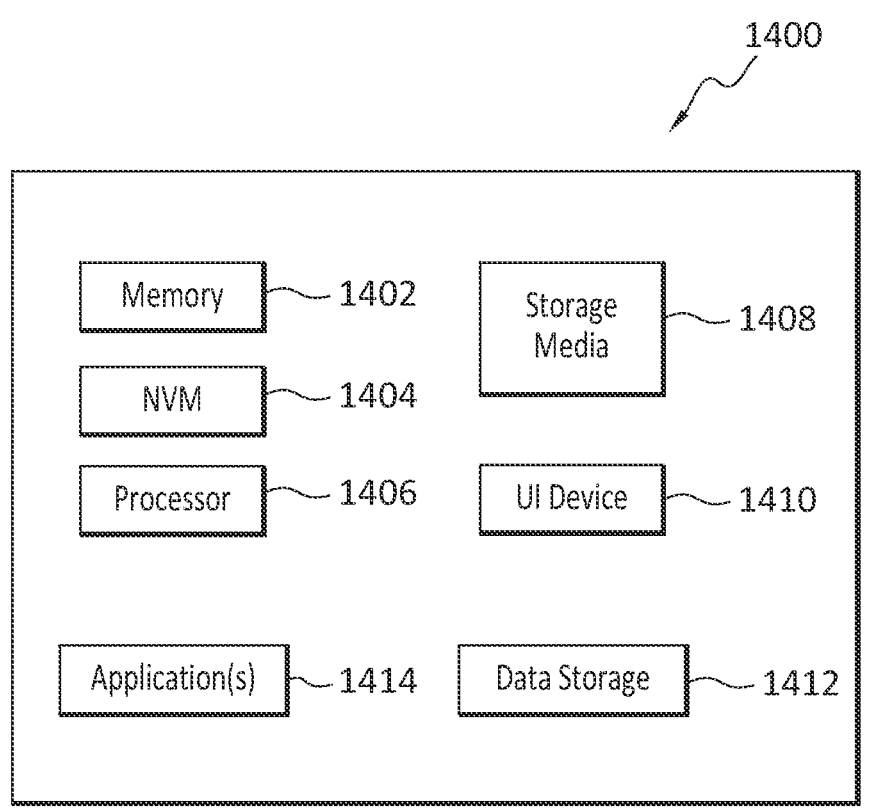
FIG. 14 discloses an example computing entity configured and operable to perform any of the disclosed methods, processes, and operations.

With reference briefly now to FIG. 14, any one or more of the entities disclosed, or implied, by FIGS. 1-13, and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes a memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI device 1410, and data storage 1412. One or more of the memory components 1402 of the physical computing device 1400 may take the form of solid state device (SSD) storage. As well, one or more applications 1414 may be provided that comprise instructions executable by one or more hardware processors 1416 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

in a node of a data confidence fabric (DCF), the node comprising hardware, calculating, as the node is booted, a static confidence score for a lowermost layer of an infrastructure of the node;

after a workload is orchestrated to the node, obtaining a workload confidence score that indicates a security of a development pipeline at a time when the workload was assembled in the development pipeline;

aggregating, by the node, the static confidence score and the workload confidence score together to obtain an overall infrastructure confidence score; and applying, by the node, the overall infrastructure confidence score to data passing through the node.

2. The method as recited in claim 1, wherein one, or other, of the static confidence score and the workload confidence score is not available, and the method further comprising:

the overall infrastructure confidence score is obtained by aggregating a confidence score corresponding to another layer with which ever of the workload confidence score and the static confidence score is available; and/or the overall infrastructure score is tagged as missing information.

3. The method as recited in claim 2, wherein the another layer is an operating system/virtual machine layer.

4. The method as recited in claim 1, wherein the lowermost layer comprises a hardware layer, and the infrastructure further comprises an operating system/virtual machine layer, and a workload environment layer in which the workload is performed.

5. The method as recited in claim 1, wherein the lowermost layer comprises a physical host.

6. The method as recited in claim 1, wherein the overall infrastructure score is applied to the data in real time as the data is passing through the node.

7. The method as recited in claim 1, wherein the static confidence score is not recalculated for a subsequent data stream that passes through the node.

8. The method as recited in claim 1, wherein a confidence score of a layer conditions confidence in any and all layers about the layer.

9. A non-transitory storage medium having stored therein instructions that are executable by one or more hardware processors to perform operations comprising:

in a node of a data confidence fabric (DCF), the node comprising hardware, calculating, as the node is booted, a static confidence score for a lowermost layer of an infrastructure of the node;

after a workload is orchestrated to the node, obtaining a workload confidence score that indicates a security of a development pipeline at a time when the workload was assembled in the development pipeline;

aggregating, by the node, the static confidence score and the workload confidence score together to obtain an overall infrastructure confidence score; and applying, by the node, the overall infrastructure confidence score to data passing through the node.

10. The non-transitory storage medium as recited in claim 9, wherein one, or other, of the static confidence score and the workload confidence score is not available, and the operations further comprise: the overall infrastructure confidence score is obtained by aggregating a confidence score corresponding to another layer with which ever of the workload confidence score and the static confidence score is available; and/or the overall infrastructure score is tagged as missing information.

11. The non-transitory storage medium as recited in claim 10, wherein the another layer is an operating system/virtual machine layer.

12. The non-transitory storage medium as recited in claim 9, wherein the lowermost layer comprises a hardware layer, and the infrastructure further comprises an operating system/virtual machine layer, and a workload environment layer in which the workload is performed.

13. The non-transitory storage medium as recited in claim 9, wherein the lowermost layer comprises a physical host.

14. The non-transitory storage medium as recited in claim 9, wherein the overall infrastructure score is applied to the data in real time as the data is passing through the node.

15. The non-transitory storage medium as recited in claim 9, wherein the static confidence score is not recalculated for a subsequent data stream that passes through the node.

16. The non-transitory storage medium as recited in claim 9, wherein a confidence score of a layer conditions confidence in any and all layers about the layer.

* * * * *